June 16, 1936  J. A. HEANS  2,044,300
VEHICLE SIGNALING DEVICE
Filed Nov. 23, 1935
Fig. 1.
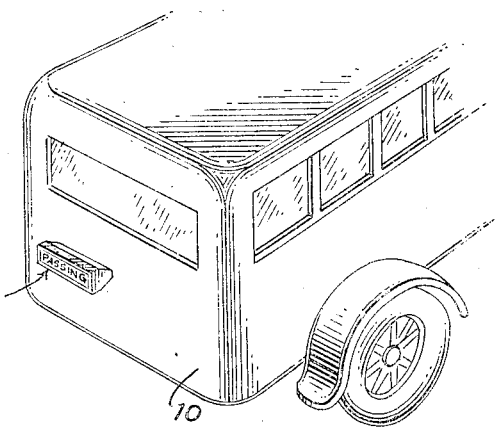
Fig. 2.
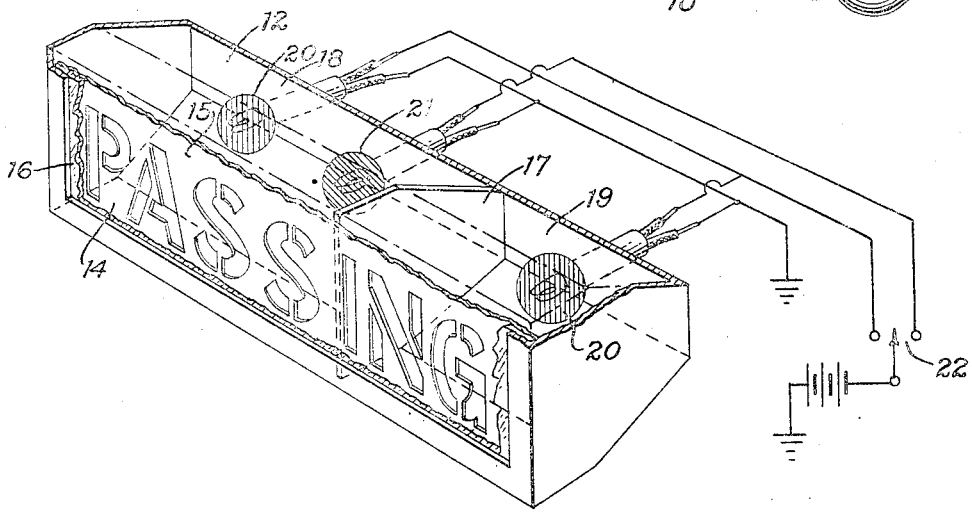
Fig. 4.
Fig. 3.
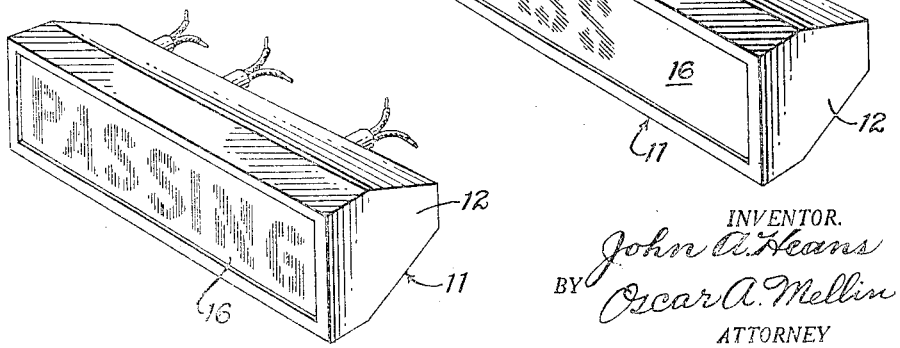
INVENTOR.
John A. Heans
BY Oscar A. Mellin
ATTORNEY Patented June 16, 1936

2,044,300

UNITED STATES PATENT OFFICE 2,044,300

VEHICLE SIGNALING DEVICE

John A. Heans, Berkeley, Calif.

Application November 23, 1935, Serial No. 51,290

4 Claims. (Cl. 177—327)

This invention relates to signaling devices for automotive vehicles.

Due to the considerable number of large trucks, both with and without trailers, which are now using the highways, traffic on the highways has been impeded and accidents have occurred, due entirely to the fact that such large vehicles obstruct the view of the road ahead of drivers in following faster vehicles. That is to say, when a car is immediately behind a truck, the driver of the car has no view of the road ahead and must turn out onto the incoming traffic lane before he can determine whether there is sufficient passing clearance. Particularly on winding roads, this not only slows up the traffic considerably but causes accidents. The drivers of the trucks, however, have a clear view of the road ahead and can signal cars following them, when there is sufficient passing clearance.

Another problem has been the lack of some medium for enabling truck drivers to signal cars in back of them, when they intend to pass a slower truck ahead. This is due to the fact that the width of the truck body and the length of the truck with the trailer places the driver of a following vehicle in a position where he cannot see any signals executed at the front of the truck by the truck driver.

It is the principal object of my present invention to provide a very simple and inexpensive signaling device which may be operated by the driver of a truck to indicate to following drivers when there is sufficient clearance for them to pass, or to signal to them when the driver of the truck intends to pass a slower vehicle ahead.

In practicing the invention, I provide a signal housing which may be mounted at the rear of the truck and which may be operated by the driver of the truck by a system of illumination to indicate to following drivers that there is sufficient clearance ahead to pass, or to indicate that the truck is contemplating passing a vehicle ahead.

One form which the invention may assume is exemplified in the following description and illustrated by way of example in the accompanying drawing, in which:

Fig. 1 is a perspective view of the rear of the truck showing my improved signaling device mounted thereon.

Fig. 2 is a perspective view of my improved signaling device with parts thereof broken away and in section to disclose its construction.

Fig. 3 is a view of the signaling device in perspective showing the PASSING signal illuminated.

Fig. 4 is a similar view but showing the PASS signal illuminated.

Referring more particularly to the accompanying drawing, 10 indicates a truck or other vehicle upon which I intend that my improved signaling device 11 be mounted. This signaling device may be positioned directly at the rear of the truck or at another point visible to a following car.

The signaling device 11 includes an elongated housing 12 here shown as constructed of sheet metal. The front of the housing is formed with a rectangular opening 14 in which is secured an opaque stencil plate 15, in which the letters PASSING are cut, these letters, of course, appearing in the opening 14. At the front of the stencil plate 15 is a translucent cover plate 16 formed of ground or other type of translucent glass.

The interior of the housing 12 is divided by an opaque partition 17 into two chambers 18 and 19. The partition 17 is positioned between the letters S and I, which appear in the stencil plate 15. In each of the chambers 18 and 19 are red incandescent bulbs 20. Also, mounted in the chamber 18 in a green incandescent globe 21. These bulbs are connected to the battery of the vehicle through the medium of a two-way switch 22 which may be located in the driver's compartment of the truck. By manipulating the switch, the circuit through the red bulbs 20 may be closed, or the circuit through the green bulb 21 may be closed.

It is seen that when the green bulb 21 is illuminated, the signal from the rear will appear as in Fig. 4 displaying the word PASS in green, which will be a signal to the driver of the following car that there is sufficient clearance ahead for him to pass. However, if the driver of the truck intends to pass a vehicle ahead, he manipulates the switch 22 to close the circuit through the two red bulbs 20, illuminating both compartments 18 and 19, so that the signal from the rear will appear as in Fig. 3 and presenting the word PASSING in red, which will indicate to the driver following the truck that the truck driver is contemplating passing a vehicle ahead.

From the foregoing it is obvious that I have provided a very simple and efficient signal for trucks and like vehicles, which may be operated by the driver to indicate either the word PASS to a following vehicle or to display the word PASSING so as to inform the following driver that the truck is going to pass a vehicle ahead. The signaling device here disclosed is exceedingly simple in construction and operation, and may be very inexpensively produced and easily installed.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A vehicle signaling device comprising a housing adapted to be mounted adjacent the rear end of a vehicle, said housing having an opening in one wall, an opaque stencil plate fitted to said opening and having the letters PASSING formed therein, and illuminating means controlled from the driver's compartment of the vehicle to illuminate the letters PASS or PASSING at the driver's option.

2. A vehicle signaling device comprising a housing adapted to be mounted at the rear of a vehicle, an opening in the rear wall of said housing, an opaque stencil plate secured to the housing in register with said opening, said stencil plate having the letters PASSING formed therein, said housing being divided into two compartments, one compartment being directly in the rear of the letters PASS, the other compartment being directly in the rear of the letters ING of the stencil plate, and separate means for illuminating only the first-named compartment or for simultaneously illuminating both compartments.

3. A vehicle signaling device comprising a housing adapted to be mounted at the rear of a vehicle, an opening in the rear wall of said housing, an opaque stencil plate secured to the housing in register with said opening, said stencil plate having the letters PASSING formed therein, said housing being divided into two compartments, one compartment being directly in the rear of the letters PASS, the other compartment being directly in the rear of the letters ING of the stencil plate, a red incandescent bulb mounted in each compartment, a green incandescent bulb mounted in the first-named compartment, and means for illuminating either the green incandescent bulb or both of said red incandescent bulbs.

4. A vehicle signaling device comprising a housing adapted to be mounted at the rear of a vehicle, an opening in the rear wall of said housing, an opaque stencil plate secured to the housing in register with said opening, said stencil plate having the letters PASSING formed therein, said housing being divided into two compartments, one compartment being directly in the rear of the letters PASS, the other compartment being directly in the rear of the letters ING of the stencil plate, a red incandescent bulb mounted in each compartment, a green incandescent bulb mounted in the first-named compartment, means for illuminating either the green incandescent bulb or both of said red incandescent bulbs, and a translucent plate arranged adjacent said stencil plate and exteriorly thereof and carried by said housing.

JOHN A. HEANS.